Dec. 20, 1955  J. H. NICHOLAS  2,727,938
SEALING GASKET
Original Filed April 4, 1951
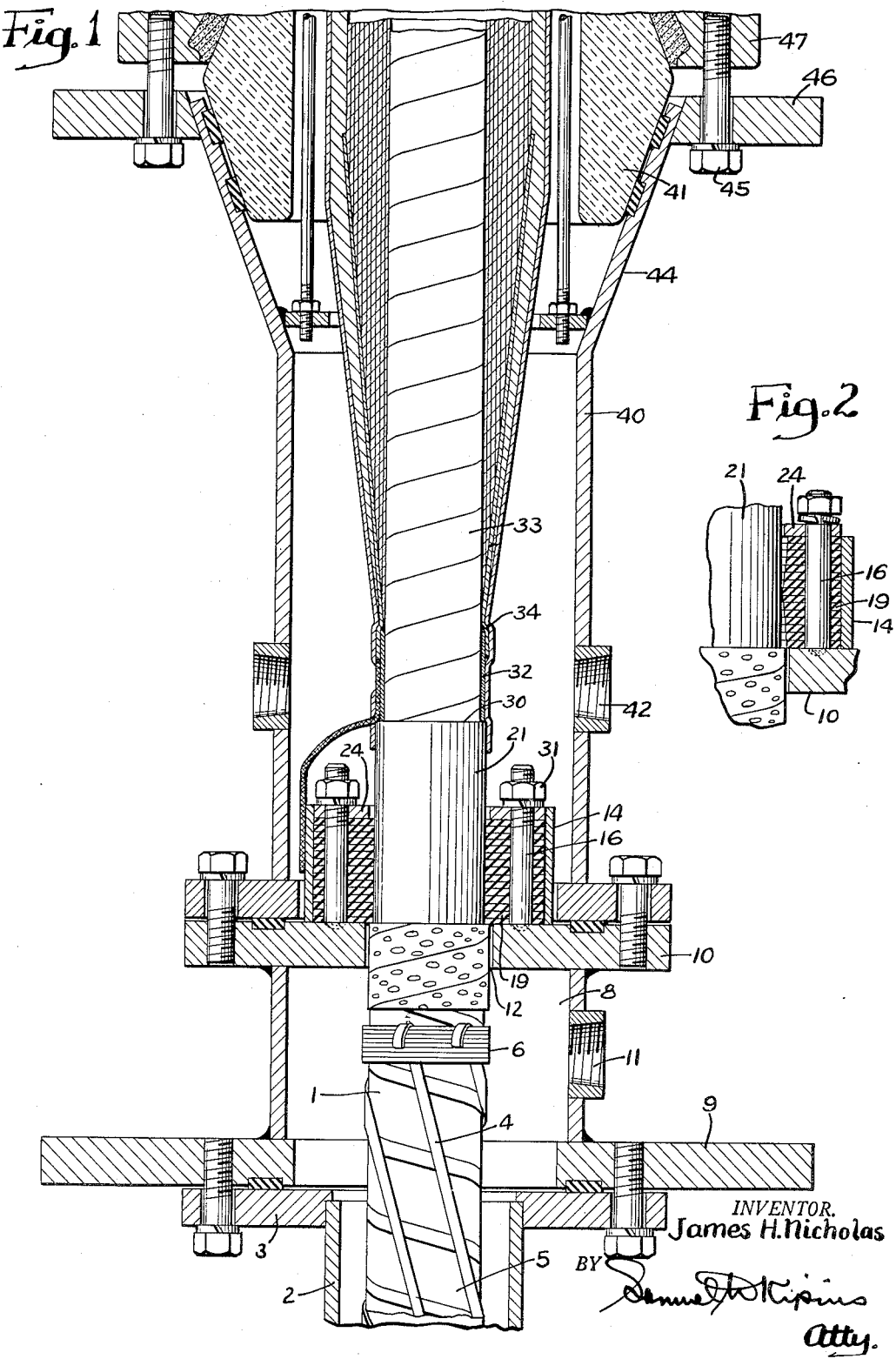
INVENTOR.
James H. Nicholas
BY
[signature]
Atty.

United States Patent Office 2,727,938
Patented Dec. 20, 1955

2,727,938

SEALING GASKET

James H. Nicholas, Chicago, Ill., assignor to G & W Electric Specialty Company, Chicago, Ill., a corporation of Illinois Original application April 4, 1951, Serial No. 219,294. Divided and this application May 20, 1952, Serial No. 288,978

7 Claims. (Cl. 174—19)

This application is a division of my pending application Serial No. 219,294, filed April 4, 1951, and relates to a seal for maintaining a liquid-tight closure around an object, such as the insulating jacket of a high voltage cable.

High voltage cables are frequently jacketed with an insulator of the material known in the trade as "polyethylene." When such a jacket is subjected to high mechanical pressure over prolonged periods of time the "polyethylene" tends to flow. Pressure seals around such jackets therefore tend to develop leaks.

It is one of the objects of the present invention to provide a pressure seal that is applicable to jackets of the above-mentioned character wherein the seal can be compressed the desired amount to subject the jacket to the necessary radial pressure in order to effect the proper seal, and wherein the sealing means is so constructed and arranged as to prevent flow of the "polyethylene" of the jacket over periods of time.

It is a further object of the present invention to provide a pressure seal that can be compressed to produce the desired pressure around the jacket and which seal is so constructed that there is a very low pressure gradient from the regions of maximum pressure to the region of minimum pressure. Because of the low pressure gradient in the region where the pressure on the "polyethylene" is maximum, there is little or no tendency for the "polyethylene" to flow. In accordance with the principles of the present invention there is provided a stack of gasket discs surrounding the cable jacket where the seal is to be made, said discs being of a material which when compressed tends to flow. The gaskets are confined against outer radial flow so that upon compression the material of the gaskets will flow radially inwardly into pressure engagement with the surrounded cable jacket. The gasket discs are of different sizes as to their internal diameters, the center one being of minimum internal diameter and the successive discs on opposite sides of the center disc being of progressively larger internal diameters. When such a gasket stack is compressed into engagement with the surrounded "polyethylene" jacket there is formed a seal wherein the gaskets are in pressure engagement with the cable insulation, but there is a pressure gradient so distributed that the pressure is minimum at the opposite ends of the stack of gaskets and maximum at the center of the stack. As a result, the tendency of the "polyethylene" insulation to flow is substantially reduced, if not entirely eliminated, because at the center where the pressure is the greatest the "polyethylene" is prevented from flowing by reason of the adjacent sealing discs that confine the "polyethylene" with progressively reduced pressures, so that at the ends of the stack the pressure is so low that flow of the "polyethylene" does not take place.

The attainment of the above and further objects of the present invention will be apparent from the following specification taken in conjunction with the accompanying drawing forming a part thereof.

In the drawing:

Figure 1 is a longitudinal sectional view through the lower part of a pothead or terminator embodying the seal of the present invention; and Figure 2 is a fragmentary view of a portion of the seal of Figure 1 before compression of the seal.

Reference may now be had more particularly to the drawings wherein like reference numerals designate like parts throughout.

In Figure 1 there is shown, diagrammatically, a portion of a cable terminator or pothead employing the seal of the present invention. This pothead terminates a high voltage cable 1 of the type that is frequently maintained under very high oil pressure. It is therefore necessary to provide a very good seal between the terminator and the cable sheath to prevent the ebb and flow of oil from the cable to the terminator and vice versa, due to expansion and contraction as the system heats and cools. The cable 1 is one standard type of high voltage cable. This cable extends into and through a grounded pipe 2 that is welded to a mounting plate 3. In use the pipe is filled with insulating oil or compound under pressure. The conventional cable skid wires 4 that surround the bronze tape grounded sheath reenforcement 5 are terminated at a grounded metal wire wrapping 6. The cable extends into and through a stainless steel pipe or compartment 8 where the cable skids are terminated. The compartment consists of an oversize pipe welded to lower and upper circular plates 9 and 10 through which the cable extends. The pipe is provided with a boss 11 for a pressure type fitting. The upper circular plate 10 has a centrally located cable receiving opening 12 through which the cable extends. A centrally located metal tube or sleeve 14 is sealed around the entire periphery of the plate 10 as by welding. The tube 14 surrounds a series of parallel, uniformly spaced axially extending bolt shanks 16 suitably secured to the plate 10. There may be six, eight or more such shanks distributed around the central cable receiving opening 12.

A stack of annular gasket discs 19 is assembled on the bolts 16. Each disc has a central hole through which the "polyethylene" cable jacket 21 extends. Around the central hole there are a series of holes, equal in number and spacing with the shanks of the bolts 16, so that the individual gasket discs may be slipped over the bolt shanks. The discs fit snugly within the tube or sleeve 14 and are stacked to a height almost equal to the height of the tube or sleeve 14. An annular metal plate 24 overlies the uppermost disc 19, the bolts 16 passing through the plate 24. The discs 19 are all of uniform outside diameter and are of varying internal diameters. The center disc, midway between the top and bottom of the stack, has the smallest internal diameter, and the central openings in the respective discs both above and below the center disc are of progressively increasing diameters. The discs are of any gasketing material which will expand radially when subjected to axial pressure and which is not adversely affected by the oil or sealing compound within the terminator. After assembly of the stack of discs and after the cable has been inserted therethrough to its proper position it is possible to form a peripheral seal around the "polyethylene" jacket or sheath 21 of the cable conductor by tightening of nuts 31 that are threaded on the shanks 16, thereby forcing the plate 24 downwardly to compress the stack of discs axially. Upon axial compression of the discs they are expanded radially inwardly, being confined against outward expansion by the tube 14. On radial inward expansion of the stack of discs the center disc is first to contact and compresses against the "polyethylene" cable sheath 21, as may be seen from Figure 2. Continued compression of the discs progressively forces more and more of the discs on opposite sides of the center disc first into contact with and then into pressure against the sheath 21 until the uppermost and lowermost discs are brought into pressure engagement with the "polyethylene" sheath 21. At this time the center disc will exert a maximum radial pressure against the sheath 21, and the discs on opposide sides of the center disc will exert progressively lesser pressure on the "polyethylene" sheath 21. Thus any tendency of the "polyethylene" of the sheath 21 to flow under the action of the pressure to which it is subjected by any disc will be resisted by the next or adjacent disc considered in a direction upwardly or downwardly from the center disc. The uppermost and lowermost disc exert less pressure than the minimum amount necessary to produce flow of the "polyethylene" but yet sufficient pressure to prevent flow under the action of the next adjacent disc.

The "polyethylene" jacket 21 is cut away to terminate at 30. Shielding metal braid 32 which is immediately within the jacket 21 and surrounds the cable insulation 33 is terminated at 34. The shielding braid 32 and the cable insulation 33 fill the "polyethylene" jacket 21 so that there is no possibility for the flow of "polyethylene" inwardly under the continued pressure of the sealing gasket.

A stainless steel body 40 provides a support for a pothead insulator 41. The body 40 is of generally circular shape at its lower end and has at its lower end a mounting plate that is placed over the plate 10, a suitable annular sealing gasket being interposed, and is firmly bolted in place. This portion surrounds the gasket heretofore described and is provided with the usual fittings 42 whereby the same may be filled with suitable insulating material under pressure. The upper portion of the body 40 is outwardly flared to form an inverted frusto conical section 44 on which the bottom of the pothead insulator 41 rests, the insulator being bolted thereto as by a number of bolts 45 that pass through a circular plate 46 that is welded to the top of the body 40, said bolts threaded into a ring 47 that is cemented or otherwise secured to the insulator 41, all as described more fully in my co-pending application Serial No. 219,294 above referred to.

From the above description it is apparent that I have provided a seal that may be clamped tightly around the "polyethylene" sleeve 21 on a cable and wherein there is a gradual change in pressure from the center of the stack of discs where the pressure is maximum to the upper and lower discs where the pressure is minimum, the pressure such that there is no tendency for the "polyethylene" to flow notwithstanding the high pressure to which parts of it are subjected.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is::

1. In combination with a cable having a sheath that is subject to cold flow, means for pressure sealing around the periphery of said sheath, said means comprising a gasketing means surrounding the member and of material that flows radially under axial compression, means surrounding the gasketing means and preventing expansion radially outwardly, the space between the gasketing means when uncompressed and the member being minimum between the ends of the gasketing means and increasing from the region of minimum spacing to the opposite ends thereof a plate against which one end of the gasketing means seats and through which the member extends, and means for drawing the gasketing means toward the plate and axially compressing the gasketing means.

2. In an apparatus wherein there is a conductor that is surrounded by insulation that is subject to cold flow when compressed and wherein the insulation is surrounded by a jacket containing a fluid medium under pressure and the insulated conductor extends outside of the jacket, means for establishing a pressure seal around the periphery of the insulation for preventing the escape of fluid around the insulation at the place where the insulation extends out of the jacket, said means comprising gasketing means surrounding the insulation and of material that flows radially under axial compression, means surrounding the gasketing means and preventing expansion radially outwardly, the gasketing means being of a minimum internal diameter in the intermediate region thereof and of gradually increasing internal diameter from said intermediate region to the opposite ends thereof, and means for axially compressing said gasketing means to force the same to flow inwardly into sealing relationship with the conductor insulation along the entire inside surface of the gasketing means that faces toward the conductor, the pressure gradient produced by the gasketing means on the insulation being below that required for cold flow of the insulation.

3. In an apparatus wherein there is a conductor that is surrounded by insulation that is subject to cold flow when compressed and wherein the insulation is surrounded by a jacket containing a fluid medium under pressure and the insulated conductor extends outside of the jacket, means for establishing a pressure seal around the periphery of the insulation for preventing the escape of fluid around the insulation at the place where the insulation extends out of the jacket, said means comprising gasketing means surrounding the insulation and of material that flows radially under axial compression, means surrounding the gasketing means and preventing expansion radially outwardly, the space between the gasketing means when uncompressed and the insulation being minimum in the region between the ends of the gasketing means and increasing from said region to the opposite ends thereof, and means for axially compressing said gasketing means to force the same to flow inwardly into sealing relationship with the conductor insulation along the entire inside surface of the gasketing means that faces toward the conductor, the pressure gradient produced by the gasketing means on the insulation being below that required for cold flow of the insulation.

4. In an apparatus wherein there is a conductor that is surrounded by insulation that is subject to cold flow when compressed and wherein the insulation is surrounded by a jacket containing a fluid medium under pressure and the insulated conductor extends outside of the jacket, means for establishing a pressure seal around the periphery of the insulation for preventing the escape of fluid around the insulation at the place where the insulation extends out of the jacket, said means comprising a gasket assembly surrounding the insulation and of material that flows radially under axial compression, means surrounding the gasket assembly and preventing expansion radially outwardly, the gasket assembly comprising a stack of discs of different internal diameters assembled with the disc of minimum internal diameter in an intermediate region of the stack and those of progressively increasing internal diameters progressively further on opposite sides of the disc of minimum internal diameter and means for axially compressing said discs to force the same to flow inwardly into sealing relationship with the conductor insulation along the entire inside surface of the gasketing means that faces toward the conductor.

5. In an electric cable bushing, electric cable means, a compressible gasketing means adjacent to said cable means for making sealing engagement with said cable means, one of asid means being subject to cold flow, the spacing between said gasketing means when uncompressed and said cable means being a minimum in an intermediate region between the ends of the gasketing means and increasing on opposite sides of said region of minimum spacing, means confining said gasketing means against outer radial flow, means axially compressing said gasketing means to cause the same to flow radially inwardly toward and into gasketing engagement with the cable along the entire inside surface of the gasketing means that faces said cable means, said intermediate region of said gasketing means applying a maximum pressure against said cable means which is sufficient to cause cold flow if cold flow is not otherwise restrained, the pressure of said gasketing means against said cable means decreasing on opposite sides of said region of maximum pressure to the points where contact between the gasketing and cable means terminates, the pressure gradient at the interface between said gasketing and cable means and the pressure at the points where contact between said cable and gasketing means terminates being sufficiently small to inhibit cold flow.

6. Means for pressure sealing around the periphery of a member that is subject to cold flow, said means comprising gasketing means surrounding the member and of material that flows radially under axial compression, said gasketing means comprising a stack of discs of different internal diameters assembled with the disc of minimum internal diameter in an intermediate region of the stack and those of progressively increasing internal diameters located progressively further away from and on opposite sides of said intermediate region, means surrounding said discs and preventing flow thereof radially outwardly, a plate structure against which one end of the stack of discs bears and through which the member extends, and means for drawing said stack of discs toward said plate structure and axially compressing the same to form a seal against said member.

7. In combination with a cable having a sheath member of material that is subject to cold flow, sealing means comprising a plate structure having an opening through which the member extends, a tube extending from said plate structure from points surrounding the opening therein, annular gasket means in and confined by said tube and bearing against said plate structure, bolt and nut means applying axial compression to said gasket means to expand the gasket radially inwardly into sealing engagement with said member, said gasket means when uncompressed having a progressively increasing internal diameter proceeding outward in both directions from an intermediate portion thereof, the portion of minimum diameter engaging with said member with a maximum force and the portions of progressively increasing diameter engaging with said member along substantially the entire length of said gasket means with progressively decreasing force to provide a pressure gradient which inhibits cold flow of said member.

References Cited in the file of this patent

UNITED STATES PATENTS

| | | |
|---|---|---|
| 200,471 | Northrup | Feb. 19, 1878 |
| 569,247 | Smith | Oct. 13, 1896 |
| 2,127,312 | Seamark | Aug. 16, 1938 |
| 2,253,987 | Shanklin | Aug. 26, 1941 |
| 2,294,262 | Wilkinson | Aug. 25, 1942 |
| 2,336,250 | Hein | Dec. 7, 1943 |
| 2,354,191 | Bennett | July 25, 1944 |
| 2,399,550 | Klein | Apr. 30, 1946 |